March 31, 1936. R. C. SIMONDS 2,035,842
PROCESS OF AND APPARATUS FOR PASTEURIZING CREAM
Filed July 18, 1933
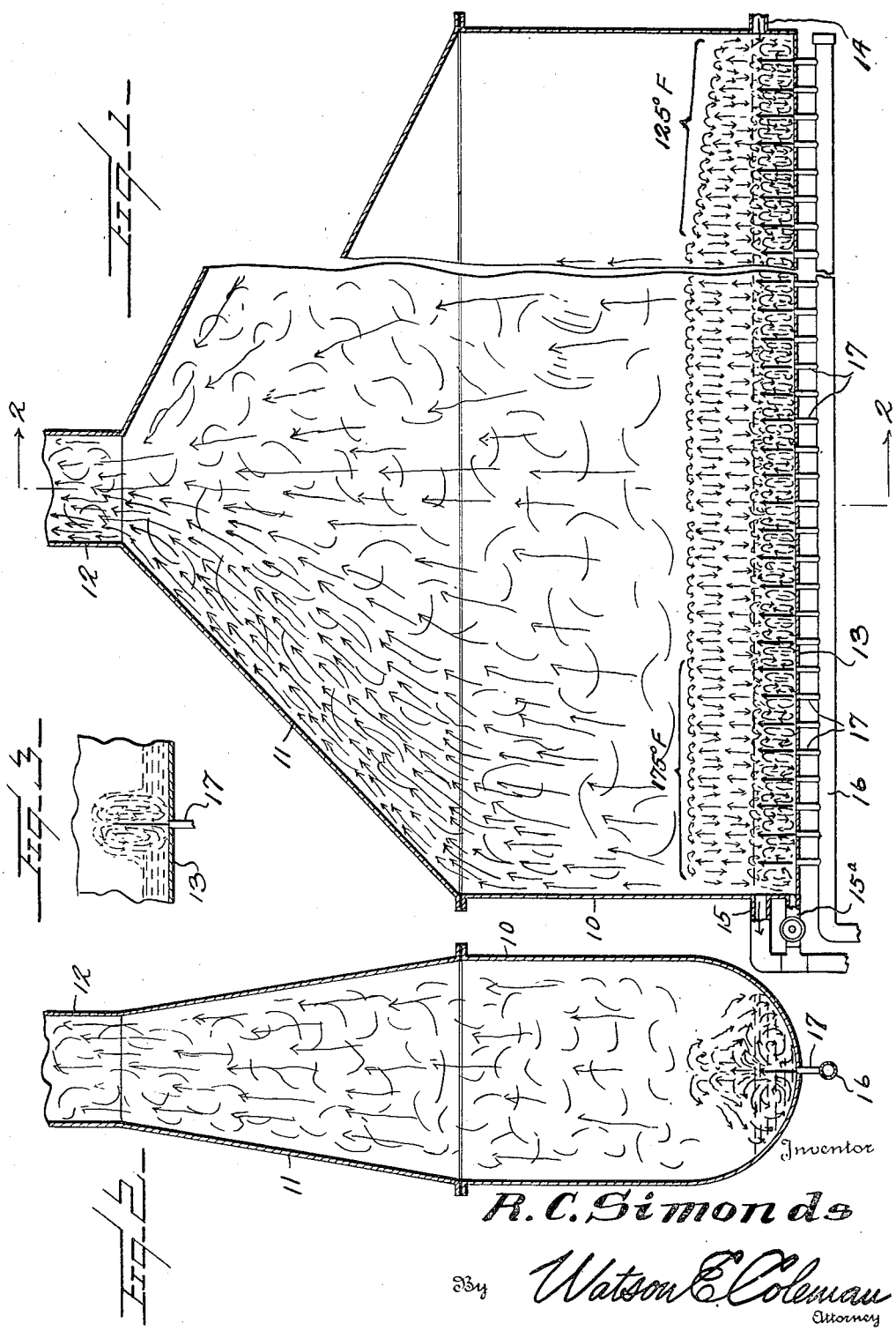

Patented Mar. 31, 1936

2,035,842

UNITED STATES PATENT OFFICE 2,035,842

PROCESS OF AND APPARATUS FOR PASTEURIZING CREAM

Roy C. Simonds, Aberdeen, S. Dak.

Application July 18, 1933, Serial No. 681,041

7 Claims. (Cl. 99—213)

Cream received at the average creamery often arrives in very poor condition particularly during the larger part of the year. Such cream must be graded into two or three grades for butter making purposes. Some of the cream is very high in acidity and has a variety of off-flavors such as yeasty, moldy, metallic, cheesy, bitter, stale, etc., these off-flavors being caused mostly by bacteria, produced while the cream is being held on the farms and during transportation. If any of these off-flavors are carried into the butter, the quality of the butter is lowered because these flavors are intensified in the butter and these flavors further cause the butter to deteriorate until it is consumed.

Milk which is sterilized to kill all bacteria, spores and other living organisms has a scorched flavor in a more or less degree, due to the high temperature to which it must be subjected in order to accomplish this end, namely, to keep over a long period of time. While cream for butter making purposes is considered by most all authorities to be pasteurized when heated to 145° F. and held for thirty minutes or its equivalent, which would be about 180° F. for an instant or about 168°–170° F. for two or three minutes. This does not kill all the bacteria, in fact, after the process of pasteurizing and the cream is cooled down to about 70° F. it is customary in most cases to add a starter to the cream to flavor it with the flavor desired by butter users. Starter is made by adding a small amount of lactic acid bacteria to pasteurized milk. After the bacteria multiply to a certain stage in the milk, the cultured milk is added to the cream in certain amounts where the bacteria again multiply and flavor the cream to the right flavor and aroma for buttermaking. This is to draw a line between sterilization and pasteurizing for buttermaking, also the difference between the different liquids to be processed.

Milk as it comes from the cow is nearly always free from bacteria, but due to the feed of the cow it may contain "off flavors", and if milk is not immediately cooled or is mixed with milk of different temperatures it may contain what we call a "cowy flavor" or odor. Cream from milk will contain the same "off flavors" if they were present in the milk, and as the cream ages, it may take on more "off flavors" and odors, caused by the bacteria development and the surroundings in which it is kept. What is desired during pasteurization is the killing of bacteria so far as possible, and the removal of all the "off flavors" and odors that is possible without changing the character of the cream, either in composition or flavor, that is, without scorching of the lactose or casein which scorching imparts the scorched flavor to the finished butter.

With the above conditions in mind and realizing the value of removing some of these off-flavors and odors, I have experimented some time past to find some means of removing these objectionable flavors and odors. My experiments have shown me that most of these that are in gaseous form or will turn to gas or vapor when heated, can be taken out by the application of steam directly into the cream while the cream is being heated to pasteurizing temperature.

There are two general methods of pasteurization at present, by one of which cream is heated in vats to a temperature of 145° F. and held in these vats for thirty minutes. This method has very serious disadvantages when used on poor grade cream, high in acidity and having various off-flavors because the vat being filled to a depth of two or three feet with cold cream, it takes from twenty to twenty-five minutes to reach the pasteurizing temperature and with only a small surface of cream exposed to the atmosphere, there is very little de-aeration or vaporization. Therefore, most of the flavors are gradually cooked into the cream. In this method of pasteurizing, hot water is used as a heating agent, transferring the heat to the cream through metal coils or through the lining of the vat. The hot metal coming in contact with the cream has a tendency to scorch the lactose in the cream, thus imparting a scorched flavor to the butter. Furthermore, the time required for this process is a disadvantage inasmuch as it requires a heating for at least twenty minutes and a holding at this heat for another thirty minutes.

The other method in use for pasteurizing cream is what is known as the "Flash" method. Here the cream is heated to 170° F. or higher for an instant. The disadvantages of this method are that a scorched flavor is nearly always imparted when coming in contact with the very hot metal and no vaporization can take place because the heating occurs inside of the air-tight drums or pipes. Therefore, the off-flavors with their odors are cooked into the cream.

The general object of the present invention, therefore, is to provide a method of pasteurization which avoids the disadvantages previously pointed out both as regards time and as regards the cooking of undesired flavors into the cream and which will secure the expulsion of volatile gases, reduction of acidity, separation and cleansing of the fat globules, tearing apart of the curd, reduction to a minimum of the possibility of scorching the lactose in the finished product, while at the same time securing a thoroughly efficient pasteurization at a relatively high speed and with low cost.

An apparatus for carrying out my method or process is shown in the accompanying drawing, wherein:—

Figure 1 is a longitudinal section through the apparatus;

Figure 2 is a vertical transverse section on the line 2—2 of Figure 1;

Figure 3 is a fragmentary enlarged section of the chamber bottom, showing diagrammatically the action of the steam on the cream.

It is to be understood, of course, that these figures are largely diagrammatic and that many of the details such as valves, gages, etc., are omitted.

Referring to the drawing, 10 designates a chamber covered by a hood or canopy 11 and having a stack 12. The bottom of the chamber is designated 13. The chamber at one end has a cream inlet 14 disposed above the bottom of the chamber and at the other end there is a cream outlet 15 disposed above the bottom of the chamber. The cream is constantly flowing from the inlet into the chamber 10 over the bottom of the chamber and out through the outlet 15.

Disposed below the chamber 10 is a steam pipe 16 connected to a source of live steam and from this pipe, jet pipes 17 extend upward through apertures in the bottom of the chamber 13. These jet pipes are arranged relatively close together and it will be understood that if the chamber is narrow only one steam pipe may be used and if the chamber is wide, a plurality of steam pipes would be used.

As illustrated, the chamber 10 decreases in width toward its upper end and has a relatively narrow rounded bottom 13.

With this apparatus, the cream as it enters the chamber 10 is raised to a temperature of 120° F. or 125° F. and when it passes off from the chamber, it has been raised to a temperature of 170° F. to 175° F. and is pasteurized. The apparatus is designed to allow only a relatively shallow stream of cream to pass over the steam jets. The jets are of such diameter and the steam is of such a pressure that the cream is given a boiling and seething motion. The cream when passing over each jet is raised in the form of a fountain to a height approximately ten inches more or less. As the steam loses its upward force, the fountain breaks into small streams and drops. These fall back into the stream of cream and the same procedure takes place when the cream passes over the next jet and so on through the process. As the cream enters the chamber cold and is viscous, it is not lifted so high but as it continues to pass over the jets, it becomes hotter and less viscous and is lifted higher into the air. The cream towards the outlet will be raised nearly twice as high as that which is entering cold at the inlet. There may be any desired number of these steam jets but the cream must pass over between the inlet and the outlet and the distance between the inlet and the outlet will be sufficiently great as to insure thorough pasteurization. The factors that secure pasteurization are: size and number of steam jets, depth of liquid passing over the jets, steam pressure and the amount of liquid allowed to pass over the steam jets in a given length of time. It will be obvious that any temperatures can be reached from a pre-warming temperature up to the boiling point and that these temperatures may be held by adjusting the rate of flow through the apparatus.

In carrying out this process, the shallow constantly flowing stream of cream upon entering the chamber 10 comes into direct contact with the steam supplied from the steam jets without, however, coming in contact with the steam pipes and as the cream flows over the steam jets, steam is discharged upward into the cream and the temperature of the cream correspondingly raised. At the same time the steam jets greatly agitate the cream which has a boiling, seething or fountain-like motion which increases in intensity as the cream moves toward the outlet and is raised in temperature. De-aeration and vaporization begin very shortly after the cream has entered the chamber and continue at a greater and greater rate until the process of pasteurizing is completed and the cream has flowed out of the opening 15. During this action, most of the off-flavors and odors are carried off in a gaseous state. The force of the steam discharged through the spray pipes into the cream tends to break up pieces of curd and separates the fat clusters and has a washing, cleansing effect upon the fat globules. This insures more complete pasteurization.

The cream does not come in contact with any hot metal, that is, any metal surface that is hotter than it is nor does it come in contact with any nozzles projecting upward into the cream. Therefore, there is but a minimum of scorched flavor.

If the lactose and casein in cream is scorched when coming into contact and being held next to very hot metal, such as metal becomes when steam under pressure is on one side of it and liquid flows on the other side, such scorching lowers the quality of such cream. What I consider one of my most important features is the manner in which the steam is added to the cream, while cream flows over the jets. The jets do not protrude through the bottom of the apparatus but only flush with the bottom of the apparatus. This is all important because there is no hot metal surface for the cream to surround or become scorched or cooked on to. If even a nut was screwed onto the top of the jet and extended up into the apparatus, this would cause some scorching to take place but where the cream flows on a perfectly flat surface and the jets are just flush with the bottom of container, there is no surface to scorch on to. When the steam hits the cream, making no difference if at the beginning of process or any of the way through, it immediately adjusts its temperature to raising the cream just a little, the cooler cream lowering the temperature of the steam and the steam raising the temperature of the cream. Thus, the cream does not come into contact with any metal surface hotter than itself and off flavors and odors are carried off during the process of heating. Lime when used for neutralizing has an affinity for the casein in the cream. This causes the formation of lumps of curd which in turn ties up particles of lime and clusters of fat. In the methods previously stated and heretofore used for pasteurizing, these lumps are not broken up, due to the lack of agitation.

By my process and with the direct application of steam, these lumps of curd are broken up, releasing the fat globules so that they may be recovered and there is no lime grit in the finished butter.

Assuming that the chamber 10 is about eight feet long and has thirty-five steam jets, about 2150 pounds of cream is pasteurized in this chamber between twenty and twenty-five minutes, that is, the cream flows through this chamber eight feet long in about this time and during this time is pasteurized. Any means may be used for maintaining a constant level of cream while flowing over the steam jets. Thus the inlet may be governed by a float valve of ordinary construction (not shown) and for the purpose of draining the cream off of the bottom of the chamber, I may provide a pipe 15a having a valve therein for cutting off or permitting the flow of cream through this pipe.

It is to be distinctly understood that preferably the steam does not spout through the cream as an unbroken jet. The amount of steam entering through the steam jets is only such an amount as will raise the cream directly over the jets. By having a stationary level of cream, say three inches deep over the jets, this cream would be raised in columns eight to ten inches high. The top of each column of cream breaks into drops which fall outward. The cream around the jets rushes over them to take the place of the amount raised, the cream that falls outward returning downward along the outside edge of the container and being again raised by the next jets.

A fairly dry steam must be used in this process. In the first part of the chamber, the cream is heated from a temperature of 120° F. to 125° F. When the steam at the inlet point of the cream, or issuing through the first jet over which the cream passes comes into contact with the relatively cold cream, the steam condenses, leaving its moisture in the cream, but the steam in this first jet has raised the temperature of the cream somewhat. The cream as it passes over the next jet absorbs the steam from this jet, which again condenses and the cream is raised in temperature. This process is repeated until the cream is about one-third way through the apparatus. At this point, the temperature has been raised to the point where the cream starts giving off vapors. For the purpose of withdrawing these vapors, the stack 12 is provided whereby these vapors may escape. As the cream comes into contact with more jets and is in turn raised in temperature, more and more vapor will be given off until near the outlet, the vapors are dense and the washing effect on the butterfat globules heretofore mentioned has taken place. Butterfat in cream does not vaporize but the moisture of water which makes up more of the volume of ordinary cream than does the fat will vaporize when subjected to heat in the manner outlined. It is not desired to vaporize the butterfat because in removing vapors from the apparatus the fat would be lost. This item is cream and is the one item which should not be lost. The force of the steam is regulated with reference to the depth of cream so that the impact of the steam causes the cream to be pushed upward in fountains but this force is not enough to cause the steam to spout as an unbroken jet through the cream.

The cream is lifted as it passes over the jets and when this lifting force has been expended, the cream falls back in fine streams or drops but while the cream is in the air and in the form of streams or drops, a great amount of vaporization and de-aeration takes place in the shortest possible time thus removing most of the "off flavors" and odors. This is impossible in a closed vessel where the "off flavors" and odors are cooked into the cream. It will be seen that with my apparatus and by my method I pasteurize, remove the "off flavors" and odors and secure the action of the steam on the butterfat globules and all this is accomplished on a constantly flowing stream of cream so that it is accomplished in a very quick manner and by an apparatus which has extreme simplicity.

While I have referred to the pasteurizing of cream, it will be understood that this process may also be used for the pasteurizing of milk. In this case, however, the steam would condense into the milk. This would cause a lower testing milk which would have to be condensed or additional milk-fat and solids added to bring this milk back to its normal condition.

The result of using my process and apparatus is that the finished butter shows a superior waxy body, much freer from stickiness than ordinary butter and having a very much improved flavor. Furthermore, by this process, I save the time ordinarily consumed in pasteurizing, this saving being approximately one-half the time required by the vat method. There is very much less and practically no scorched flavor and the butter is of much better quality due to aeration and cleansing than butter made from cream pasteurized by the "Flash" method.

It is particularly emphasized that by this process and by the use of this apparatus, the initial and operating cost is rendered very low and the speed and efficiency of operation increased, that there is a great reduction of acidity and, therefore, less neutralizing needed and that there is a continuous operation which is nearly automatic and that there is a great improvement in the flavor and body of the resultant butter.

I claim:—

1. An apparatus for pasteurizing cream including a chamber having a bottom formed with a series of closely adjacent perforations, means for constantly introducing cream at the bottom of the chamber and removing cream from the bottom of the chamber at a separate point, the perforations being disposed between the point of introduction and the point of removal, said means being disposed adjacent the bottom of the chamber whereby a relatively shallow stream of cream is caused to flow over said bottom, and means for discharging jets of steam upward through the perforations in the bottom of the chamber, the chamber having a vapor outlet.

2. An apparatus for pasteurizing cream including a chamber having a perforated, smooth bottom, a steam pipe disposed below the bottom and spaced therefrom and having jets discharging upward through the perforations in the bottom of the chamber, the chamber having a vapor outlet, and means for constantly introducing cream at one end of the chamber and removing the cream from the other end of the chamber, the perforations and the jets being arranged in series between the opposite ends of the chamber said means being disposed relatively adjacent to the bottom whereby to cause a constant shallow stream of cream to flow at a certain speed over the bottom of the chamber while it is agitated and pasteurized by the upwardly discharging jets.

3. An apparatus for pasteurizing cream including a chamber having a transversely rounded smooth perforated bottom, the chamber having a vapor outlet in its upper portion, a steam pipe disposed below the bottom of the chamber and spaced therefrom and having jet pipes extending upward from the steam pipe into but not through said perforations, the perforations and the jets being arranged in a series longitudinally of the chamber, means for constantly introducing cream at one end of the chamber and removing the cream from the other end of the chamber, said means being disposed relatively adjacent the bottom whereby to cause a constant shallow stream of cream to flow at a certain speed over the bottom of the chamber while it is agitated and pasteurized by the upwardly discharging jets.

4. A process of pasteurizing a liquid which consists in heating, de-aerating and highly agitating the liquid by directing closely approximated jets of steam into a shallow stream of the liquid flowing over a surface having a temperature less than will scorch the liquid, the steam being at a pressure such that the jets of steam will cause the violent ebullition of the liquid without the steam spouting through the liquid in an unbroken jet, the depth of the stream, its rate of travel and the length of the stream being such as will secure pasteurization.

5. A process of pasteurizing a liquid which consists in heating, de-aerating, and highly agitating the liquid in a vessel having a vapor outlet by directing closely approximated jets of steam through the bottom of the vessel and into a constantly flowing shallow stream of the liquid, the bottom of the vessel being at a temperature less than that which will scorch the liquid and the steam being at a pressure such that the steam causes the violent ebullition of the liquid without the steam spouting through the liquid in an unbroken jet, the temperature and pressure of the steam, the depth of the stream, its rate of travel and the length of the stream being such as will secure pasteurization.

6. A process of pasteurizing a liquid which consists in heating, de-aerating and highly agitating the liquid by causing the liquid to flow in a shallow stream over a surface having a temperature less than will scorch the liquid while directing jets of steam at closely adjacent points along the length of the stream upward into the liquid, the steam being at a pressure such as will cause the violent ebullition of the liquid without the steam spouting through the liquid in an unbroken jet, the steam being at such a temperature and the stream being of such a depth and flowing at such a rate as will secure pasteurization.

7. A process of pasteurizing cream which consists in causing the cream to flow in a shallow stream over a surface having a temperature less than will scorch the cream while directing jets of steam disposed at closely adjacent points along the length of the stream upward into the cream, the steam being at a pressure such as to cause the violent ebullition of the liquid without the steam spouting through the cream in an unbroken jet, the temperature of the steam, the depth of the stream, its rate of travel and the length of the stream being such as will secure pasteurization.

ROY C. SIMONDS.